No. 791,966. PATENTED JUNE 6, 1905.
J. WHITELAW.
REVERSING VALVE.
APPLICATION FILED SEPT. 23, 1904.
3 SHEETS—SHEET 1.
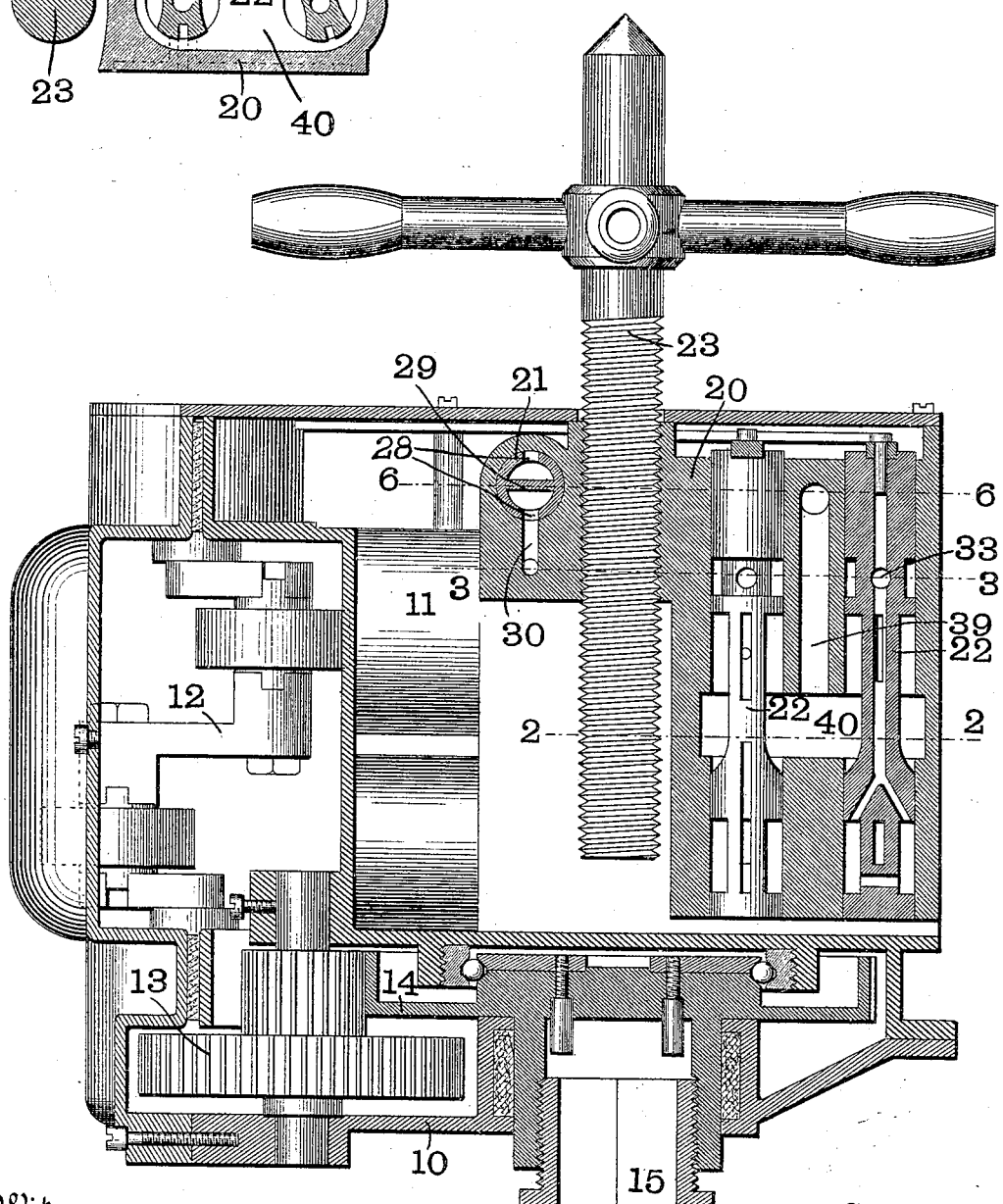

No. 791,966. PATENTED JUNE 6, 1905.
J. WHITELAW.
REVERSING VALVE.
APPLICATION FILED SEPT. 23, 1904.

3 SHEETS—SHEET 2.

Witnesses
W. A. Alexander
Fred Heuke

Inventor
J. Whitelaw.

By Attorneys
Fowler & Bryson

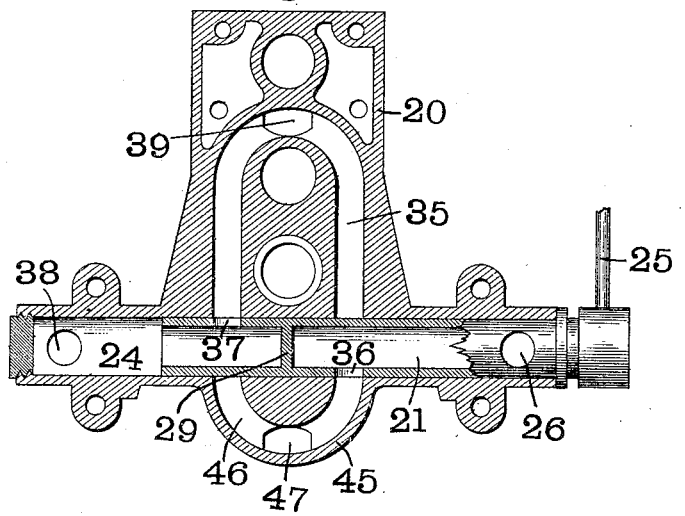
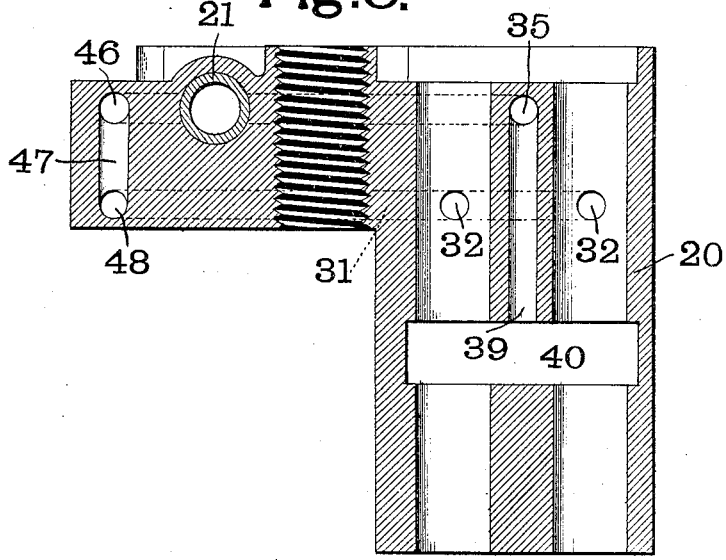

No. 791,966. Patented June 6, 1905.

UNITED STATES PATENT OFFICE.

JAMES WHITELAW, OF ST. LOUIS, MISSOURI.

REVERSING-VALVE.

SPECIFICATION forming part of Letters Patent No. 791,966, dated June 6, 1905.

Application filed September 23, 1904. Serial No. 225,608.

*To all whom it may concern:*

Be it known that I, JAMES WHITELAW, a citizen of the United States, residing at the city of St. Louis, State of Missouri, have invented a certain new and useful Reversing-Valve, of which the following is such a full, clear, and exact description as will enable any one skilled in the art to which it appertains to make and use the same, reference being had to the accompanying drawings, forming part of this specification.

My invention relates to a reversing-valve, and is more particularly intended to be used in connection with a fluid-motor like that shown in my application, Serial No. 174,700, filed September 26, 1903.

The object of my invention is to produce a reversing-valve which will be simple in construction and reliable in operation.

Figure 3:
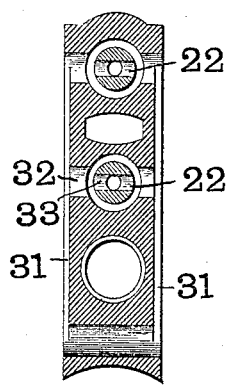
Figure 4:
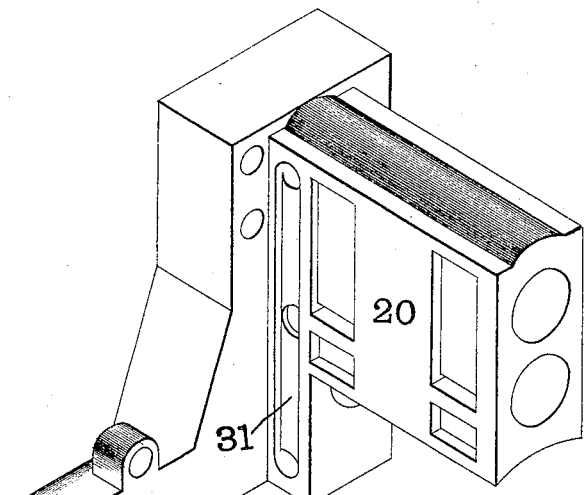
Figure 5:
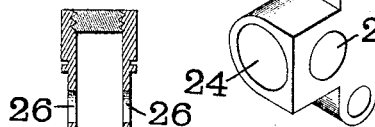
Figure 6:
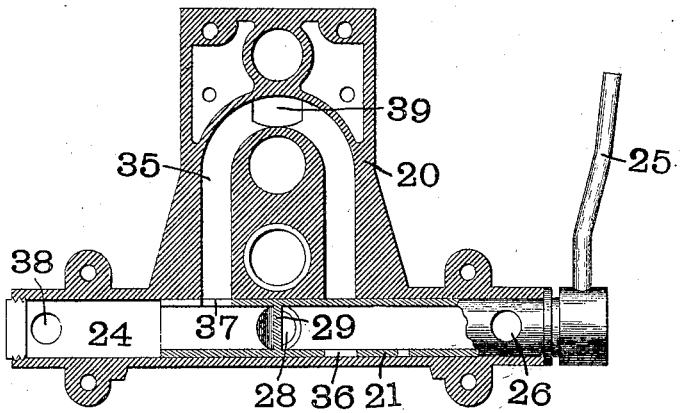

In the accompanying drawings, which illustrate two forms of reversing-valve made in accordance with my invention, together with a fluid-motor to which the same is applied, Figure 1 is a vertical section. Fig. 2 is a section on the line 2 2 of Fig. 1, showing the valve-casing and controlling-valves. Fig. 3 is a section on the line 3 3 of Fig. 1. Fig. 4 is an enlarged isometric projection of the valve-casing. Fig. 5 is a longitudinal section of the reversing-valve. Fig. 6 is a section through the valve-casing, taken on the line 6 6 of Fig. 1; and Figs. 7 and 8 are a horizontal and a vertical section, respectively, showing a slightly-modified form of valve and valve-casing.

Like marks of reference refer to similar parts in the several views of the drawings.

10 indicates the main casing or housing of the motor. Formed in this casing or housing 10 are cylinders 11, containing pistons driving a crank-shaft 12. This crank-shaft 12 is connected by intermediate gearing 13 with a master-wheel 14, provided with suitable means, such as the socket 15, for connecting the motor to a drill or other tool.

The parts above referred to are fully described in my prior application, and hence will not be described in detail in the present application.

20 is the valve-casing. This casing 20 contains the reversing-valve 21 and the controlling-valves 22, which control the flow of motive fluid to and from the cylinders 11. The casing 20 also contains the feed-screw 23, by means of which the drill or other tool is fed to the work. The reversing-valve 21 is hollow and cylindrical in form and fits in a suitable cylindrical passage 24 in the valve-casing 20. One end of the valve 21 projects beyond the casing and is provided with a handle 25, by means of which the valve is rotated to reverse the supply and exhaust of the motive fluid and also to stop the motor by cutting off the supply of motive fluid. In one end of the valve 21 are two diametrically opposite openings 26, which are adapted to be brought into register with the supply-opening 27 in the lower face of the casing 20, through which the supply of motive fluid is led to the valve 21. When the valve is turned in such a position that neither of the openings 26 are in register with the supply-opening 27, the motive fluid is cut off and the motor is stopped. The valve 21 is also provided at an intermediate point in its length with two diametrically opposite ports 28. These ports 28 are divided by an inclined partition 29, and each is adapted to be placed into register with a port 30. (Best shown in Fig. 1.) This port 30 communicates, through passages 31 in the sides of the valve-casing 20, with two cross-passages 32, thus supplying the motive fluid to the interior of the two controlling-valves 22 through passages 33. The valve-casing 20 is also provided with a U-shaped passage 36, which has two openings into the passage 24, containing the valve 21. The valve 21 is provided with a pair of ports 36 and 37, one at each side of the partition 29. The port 36 is adapted to be brought into register with one opening of the passage 35, and the port 37 is adapted to be brought into register with the other opening of said passage. The end of the valve 21 is open, so that it is always in communication with the exhaust-port 38, which exhausts the motive fluid from the casing. The passage 35, hereinbefore described, communicates, through a passage 39, with an enlarged chamber 40 in the valve-casing 20, and this chamber places the motive fluid or exhaust, as the case may be, in communication with the outer ports in the controlling-valves 22.

In Figs. 7 and 8 I have shown a slightly-modified form of valve-casing and valve. In this construction the valve-casing 20 is provided with an extension 45, in which is formed a U-shaped passage 46, similar to the passage 35, hereinbefore described, but shorter. One end of this passage 46 is adapted to register with the port 36 in the valve 21 when the valve is turned in one position, and the other end of the said passage 46 is adapted to register with the port 37 in the said valve when the valve is turned in the other position. Extending downwardly from the U-shaped passage 46 is a passage 47. This passage 47 communicates, by means of a cross-passage 48, with the passages 31 in the sides of the valve-casing hereinbefore described. In this construction the two ports 28 are omitted from the valve 21, and consequently the partition 29 may be made perpendicular to the axis of the valve in place of being inclined thereto.

It will be evident from the above description that when the reversing-valve 21 is in the position shown in Fig. 6 the supply of motive fluid will pass down through one of the ports 28 and the port 30 into the passages 31 and will be thus placed in communication with the internal ports in the controlling-valves 22. At the same time the external ports of the controlling-valves 22 will communicate, through the passage 39 and the passage 35, with the port 37 in the valve 21 and thence with the external port 38. The motor will thus run in one direction. By turning the valve 21 a half-revolution, however, the supply will pass through the port 36 into the passage 35 and thence down through the passage 39 to the chamber 40, and the external ports of the controlling-valves 22 will thus be in communication with the supply, while the internal ports will be in communication with the exhaust through the passages 33, 32, 31, and 30. As the passage 30 is now in communication with the port 28 at the rear side of the dividing-wall 29, and consequently communicates with the exhaust 38, it will be seen that in this position the supply and exhaust are reversed, and consequently the motor will run in the opposite direction. By turning the valve 21 one-fourth of a revolution from the position shown in Fig. 6 both of the ports 26 will be moved out of register with the supply-port 27, and consequently no motive fluid can enter the valve-casing.

The operation of the form of valve shown in Figs. 7 and 8 will be substantially the same as that above described. In place, however, of the motive fluid passing to or from the interior of the valves by way of one of the ports 28 and passages 30 and 31 it will pass to or from said chamber by way of the U-shaped passage 46 and the passages 47, 48, and 31.

Having fully described my invention, what I claim as new, and desire to secure by Letters Patent of the United States, is—

1. The combination with one or more controlling-valves, of a fluid-supply and an exhaust, a reversing-valve interposed between said supply and said controlling valve or valves and also communicating with said exhaust, and two passages extending between said reversing-valve and said controlling valve or valves, one of said passages having two openings or ports each adapted to communicate with a port in said reversing-valve.

2. The combination with one or more controlling-valves, of a fluid-supply and an exhaust, a hollow rotary reversing-valve interposed between said supply and said controlling valve or valves and also communicating with the exhaust, said reversing-valve being provided with a partition and a port at each side of said partition, and two passages extending between said reversing-valve and said controlling valve or valves, one of said passages having two openings or ports each adapted to communicate with one of the ports in said reversing-valve.

3. The combination with one or more controlling-valves, of a fluid-supply and an exhaust, a hollow rotary reversing-valve interposed between said supply and said controlling valve or valves and also communicating with the exhaust, said reversing-valve being provided with a partition and two pairs of ports, one port of each pair being at each side of said partition, and two passages extending between said reversing-valve and said controlling valve or valves, one of said passages having two openings adapted to communicate with one pair of ports in said reversing-valve, and the other passage having a single opening adapted to communicate with the other set of ports in said reversing-valve.

4. The combination with one or more controlling-valves, of a fluid-supply and an exhaust, a hollow rotary reversing-valve interposed between said supply and said controlling valve or valves and also communicating with the exhaust, said reversing-valve being provided with a partition and two pairs of ports, one port of each pair being at each side of said partition and one pair of ports being diametrically opposite each other, and two passages extending between said reversing-valve and said controlling valve or valves, one of said passages having two openings adapted to communicate with one pair of ports in said reversing-valve, and the other passage having a single opening adapted to communicate with the other set of ports in said reversing-valve.

In testimony whereof I have hereunto set my hand and affixed my seal in the presence of the two subscribing witnesses.

JAMES WHITELAW. [L. S.]

Witnesses:
 A. C. FOWLER,
 D. C. BETJEMAN.